United States Patent

Hipsher

[15] 3,698,703
[45] Oct. 17, 1972

[54] DUAL RATE FLUID DAMPED ELASTOMERIC BUSHING

[72] Inventor: Gary L. Hipsher, Logansport, Ind.
[73] Assignee: The General Tire & Rubber Company
[22] Filed: Nov. 23, 1970
[21] Appl. No.: 91,898

[52] U.S. Cl. ...................................267/63, 268/10
[51] Int. Cl. ..............................................F16f 9/10
[58] Field of Search ..........................267/63; 248/10

[56] References Cited

UNITED STATES PATENTS

| | | | |
|---|---|---|---|
| 3,147,964 | 9/1964 | Wolf | 267/63 |
| 2,457,949 | 12/1948 | Thiry | 248/10 |

*Primary Examiner*—James B. Marbert
*Attorney*—Frank C. Rote, Jr. and Harry F. Pepper, Jr.

[57] ABSTRACT

A fluid damped bushing comprises an annular rubber insert radially compressed between a pair of rigid sleeves. The curved outer surface of the insert contains a pair of radially spaced voids which co-operate with the outer sleeve to form enclosed pockets. These pockets are interconnected and are filled with a suitable fluid to provide the bushing with high damping characteristics in the radial direction through the pockets. The generally parallel and planar ends of the insert are voided around the inner sleeve to form suitable recesses. The recesses are separated from the fluid pockets by relatively thin webs which flex rather than undergo compression to provide a very low spring rate in the direction through the fluid. The radial spring rate at right angles to the pockets is considerably higher and may be as much as five times as great as the spring rate through the pockets. The inner sleeve is preferably shaped to give a highly planar surface in the direction of a high spring rate. The bushing can be used, for example, as a vibration isolator between an engine and the frame of a vehicle.

4 Claims, 7 Drawing Figures

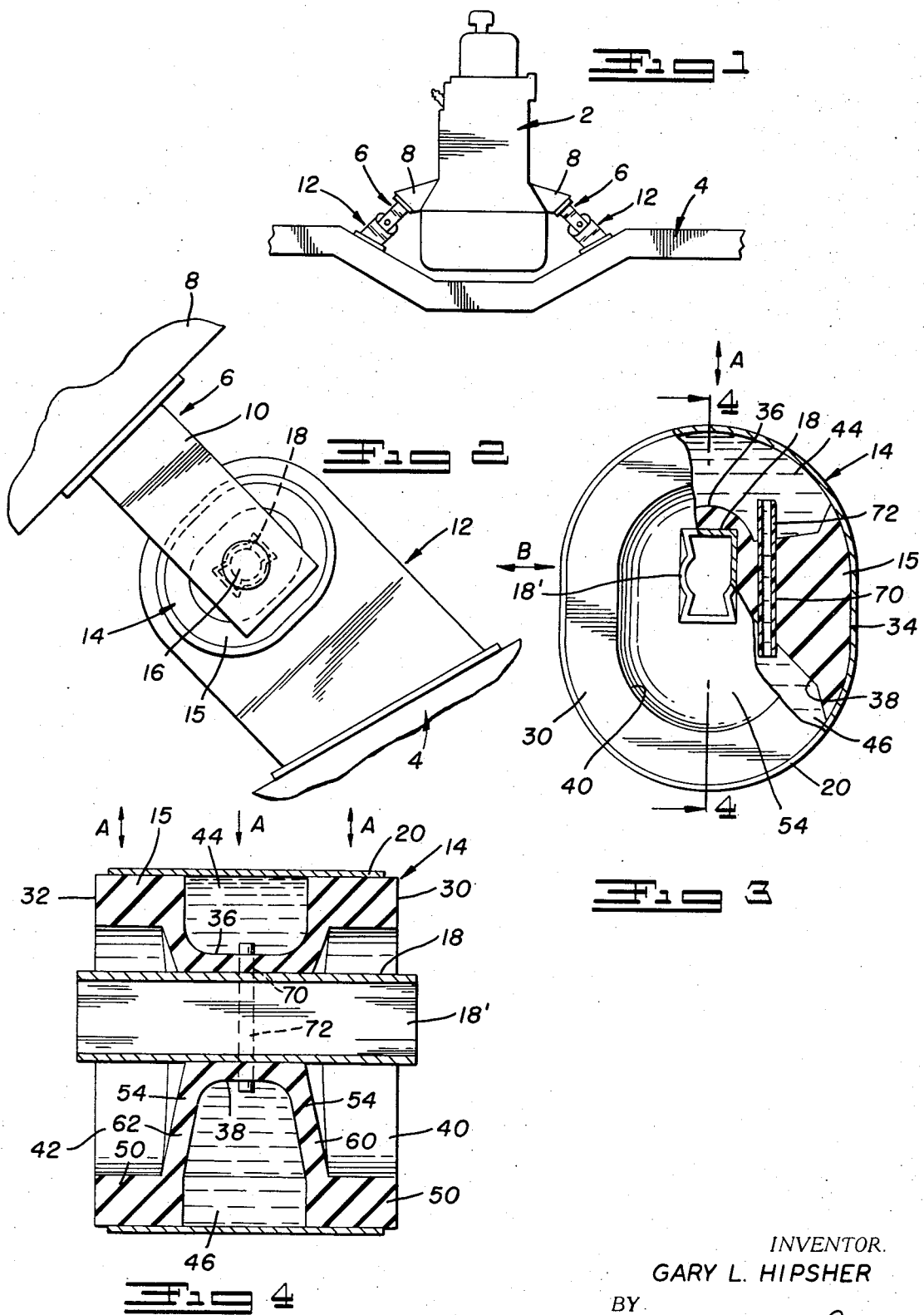

INVENTOR.
GARY L. HIPSHER
BY
Harry F. Pepper Jr.
ATTORNEY

DUAL RATE FLUID DAMPED ELASTOMERIC BUSHING

BACKGROUND OF THE INVENTION

Much time and effort have been devoted to controlling or eliminating vibration and noise in automotive vehicles, while continuously improving the ride and comfort. Of prime concern in this continuous quest for better vibration isolation and noise control has been the development of highly sophisticated vibration isolators and bushings. One of the most common types of bushings has comprised an insert of rubber, generally cylindrical, held between a pair of metal sleeves. Initially, the rubber inserts were molded and were assembled between the sleeve after which the bushing was heated to cure the rubber and bond it to the sleeve. During curing, the internal stresses of the rubber were relieved. It was later found that if the insert remained stressed, the capacity and life of the insert was markedly improved. Accordingly, it was common practice to mold and then cure the inserts after which the insert was assembled between the sleeves, under substantial radial compression. The compressive forces served to constrain the insert within the sleeve and prevented the insert from slipping relative to the inner and outer sleeves. Further improvements comprised molding recesses into the insert to give different spring rates in different directions as disclosed in U.S. Pat. No. 3,147,964 to Wolf; varying the hardness of the rubber in the insert as disclosed in U.S. Pat. No. 3,424,447 to Miller; and using fluids to dampen the bushing in certain radial directions, as disclosed in copending U.S. application Ser. No. 755,268, filed Aug. 26, 1968 now abandoned in favor of a continuation-in-part application U.S. Ser. No. 45,740 filed June 12, 1970, now U.S. Pat. No. 3,642,268. The aforementioned patents and application are assigned to the assignee of the present invention.

It has been found, however, that even with the judicious use of voids and pockets in the insert, it was difficult to obtain a dramatic difference between radial spring rates in the direction through the pockets and the radial spring rates in the direction at right angles to the pockets. Usually, these differences were on the order of 1½ to 2½ times. One reason for this, especially in fluid-filled bushings, is that the ends of the bushing must contact the outer sleeve in order to provide a continuous surface so that the fluid-filled pocket would be completely enclosed. This continuous surface provides a solid column of rubber which must be compressed between the inner and outer sleeves during deflection of the bushing, thereby raising the spring rates of the bushing in this direction. This is a particularly undesirable characteristic in environments where a low spring rate is desired in one radial direction in combination with a high radial spring rate in another direction.

BRIEF DESCRIPTION OF THE PRESENT INVENTION

It is an object of this invention to provide a closed-end bushing with a low spring rate.

Another object is to provide a recess at each end of an elastomeric bushing around the inner sleeve to minimize the radial dynamic spring rate of the bushing.

Yet another object of the present invention is a damped bushing wherein the dynamic spring rate in a solid direction is several times as great as the spring rate through the fluid-filled pockets of the bushing.

These and other objects are achieved by providing a bushing having a molded rubber insert of generally oval or round contour with a pair of opposed voids in the outer surface which contact the outer sleeve of the bushing to form fluid-containing reservoirs, a recess in either end of the insert around the inner sleeve of the bushing, and a fluid connection between the pockets for high damping.

BRIEF DESCRIPTION OF THE DRAWINGS

FIG. 1 is a view of an internal combustion engine mounted to a frame of a vehicle or the like;

FIG. 2 is an enlarged view of an engine mount with a resilient bushing according to the present invention shown therein;

FIG. 3 is an end view of an unloaded bushing according to the present invention with portions thereof being shown broken away and in section;

FIG. 4 is a cross-sectional view taken along lines 4—4 of the busing shown in FIG. 3;

DETAILED DESCRIPTION OF THE INVENTION

Figure 7:
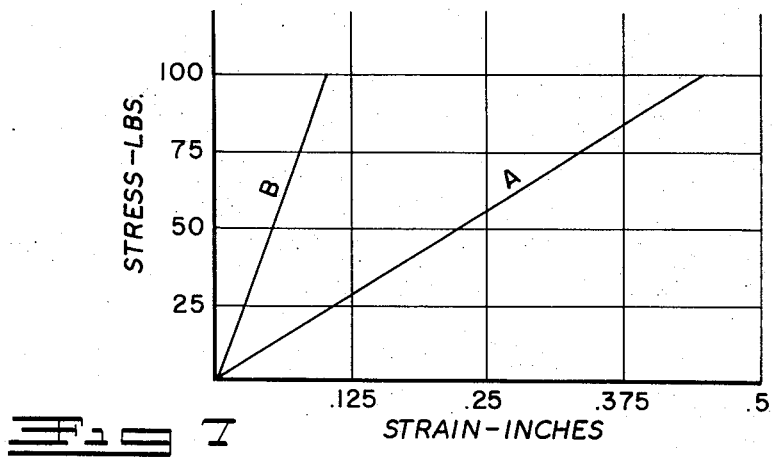
FIG. 7 is a graph showing a rate deflection curve in each of the radial directions of a bushing according to the invention.

Referring in detail to the drawings, FIG. 1 shows an engine 2 supported above the cross-member 4 of a vehicle frame. The engine is supported by the frame through several sets of brackets 6, two of which are shown in FIG. 1. Each set of brackets is joined by a bushing of the type described in the present invention. FIG. 2 shows more details of a typical set of brackets, and shows an engine flange 8 to which is attached a clevis or U-shaped bracket 10. The cross-member 4 has a typical frame bracket 12 secured thereto, which frame bracket grips or otherwise suitably holds the outer surface of a bushing generally indicated as 14. A pin or bolt 16 extends through the bushing 14 and is held within the two legs of engine bracket 10. Engine vibrations are transmitted through bracket 10 and pin 16 to a center or inner sleeve 18 (shown in outline in FIG. 2) of the bushing 14. A rubber insert 15 isolates these vibrations from an outer sleeve 20 of the bushing which is engaged by the frame bracket 12. The amount of isolation is dependent upon the properties of the rubber and the characteristics, position and location of the bushing.

More details of the bushing 14 of the present invention are shown in FIGS. 3 through 6. The bushing 14 comprises a rubber insert 15, an inner sleeve 18 and an outer sleeve 20. The outer sleeve is shown to be generally oval and may be formed by stamping, casting, or other suitable processes, from an appropriate high strength metal. The inner sleeve 18 is shown as generally rectangular, with portions 18' of the ends thereof shaped to receive and position a generally circular bolt or pin.

Figure 5:
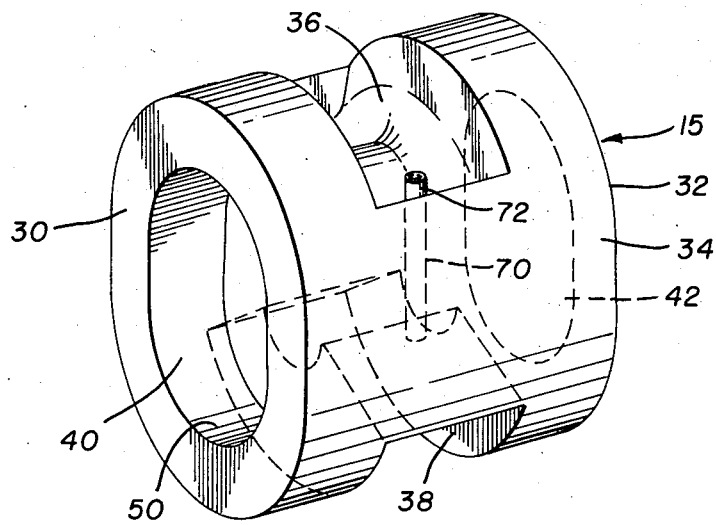
FIG. 5 is a perspective view illustrating details of a rubber insert used in the bushing according to the present invention.

The rubber insert 15 is preferably compounded from a highly resilient rubber stock, such as natural rubber, and is formulated to give a hardness of between 35 and 50 Durometer (Shore A). As seen in FIG. 5 the insert 15 is provided with a pair of generally parallel ends 30, 32, joined together by a curved outer surface 34 (see FIGS. 3 and 5) in the shape of a cylindroid as shown or a right cylinder. The insert contains two voids 36, 38 along the outer curved surface 34, and two axial recesses 40 and 42 at the two ends 30, 32 respectively of the insert.

As seen in FIGS. 3 and 4 the voids 36, 38 are radially opposed and are separated from one another by the inner sleeve 18 and a thickness of rubber at least equal to the larger dimension of the rectangular sleeve 18. The voids 36, 38 co-operate with the outer sleeve 20 to form two fluid-filled pockets 44, 46.

Each of the axial recesses 40 and 42 comprises a sidewall 50, generally parallel to the inner sleeve 18, and a slightly conical bottom 54, which tapers inwardly toward the inner sleeve. The bottom of each recess thus forms one wall of a pair of spaced webs 60 and 62 separating the recesses 40 and 42 from the fluid-filled pockets 44 and 46. These webs are preferably at least about 0.15 inch thick.

The thickness of rubber insert 15, as molded, is preferably about 10 to 30 percent greater than the area between the inner and outer sleeves, and the length of the insert is correspondingly shorter than its length in the final assembly. Thus the insert must be forced between the two sleeves and is radially compressed therebetween. This compression causes the insert to elongate slightly when disposed between the two sleeves. The radial compression further helps to prevent the insert from slipping relative to the inner and/or outer sleeves during use.

A tubular passageway 70 is shown in FIGS. 3, 4 and 5 between and connecting the two voids 36, 38. Before assembly of the bushing, a suitable tubular member 72 made out of Delrin or Nylon may be inserted into the passageway 70. After assembly, a fluid can be injected into the pockets formed by the voids and the outer sleeve. This injection may be achieved by a pair of hollow needles, a first for introducing the fluid and a second to bleed the air from the pockets as fluid is introduced. Preferably, an inert fluid, such as a silicone oil, glycol, or the like, is used. After the injection needle and air-bleed needle are withdrawn, the radial compression of the rubber seals the holes, and the fluid remains in the pockets. High damping is achieved in the radial direction through the bushing by the flow characteristics and properties of the fluid, as well as the dimensions and flow properties of the tube 72 connecting pockets 44 and 46. The manner of injecting the fluid into the pockets, as well as the type and nature of the fluid and tube do not comprise a part of the present invention. These details are more fully disclosed in U.S. Pat. application Ser. No. 755,268 and U.S. Pat. No. 3,642,268 referred to hereinbefore.

In FIG. 4 it is seen that in the radial direction, i.e. at right angles to the bushing axis, the resistance to deflection through the fluid-filled pockets (i.e. in the direction of arrows A) is provided through the webs 60 and 62. These webs will flex rather than compress resulting in little resistance to radial deflection, effecting a very low bushing spring rate. Conversely, in the radial direction perpendicular to the direction through the pocket (i.e. in the direction of arrows B) deflection of the bushing results in compression of the rubber between the 18 and sleeve 18 outer sleeve 20, thereby resulting in a much higher spring rate. The resistance to compression is even more pronounced because of the generally rectangular design of inner sleeve 18. The planar surface of the sleeve serves to confine the rubber between the two sleeves during compression and reduces the tendency of the rubber to flow around and escape compression, as could result from the use of a circular inner sleeve. At the same time, the flat surface of the sleeve in the radial direction through the pockets (i.e. the direction of arrows A) does not materially increase the spring rate of the bushing in that direction inasmuch as the rubber is merely pushing into the fluid-filled space, and the rubber is not being thereby compressed.

When the bushing is assembled, the two fluid-filled pockets 44, 46 are of unequal size as clearly shown in FIG. 4 wherein the inner sleeve 18 is offset toward the smaller pocket 44. The deflection properties and the amount of offset are determined so that the static deflection of the bushing in the vertical direction, due to the weight of the engine, causes the inner sleeve 18 to deflect downwardly and to become centered with respect to the outer sleeve 20. This centering serves to equalize the size of the two pockets 44 and 46. Because the bushing is considerably stiffer in the radial direction perpendicular to the two pockets, the deflection in this direction due to the static weight of the engine is not appreciable. When used as a support for an engine, typically three or more bushings are utilized to carry the load of the engine.

As previously mentioned, the rubber insert 15 is held under radial compression. The compressive force of the rubber against the outer sleeve 20 and inner sleeve 18 is normally sufficient to prevent slipping of the rubber between the sleeves and to prevent leakage of the fluid out of the pockets 44 and 46. To further ensure against leakage and to prevent slipping of the rubber with respect to the two sleeves, the rubber insert can be bonded to either of both of the sleeves. There are several types of bonding systems that can be used. A typical bonding system is described in the U.S. Pat. No. 3,387,839 owned by the assignee of the present invention. This system consists of a primer and an adhesive coat. The primer comprises a solution of a halogenated rubber and is applied to the metal sleeves and is thereafter dried after which the adhesive coat, comprising a diisocyanate and a chlorinated nitrile rubber, is applied to the sleeves. After this, the bushing is assembled and the assembly is followed by heating to activate the bond. This bond is normally stronger than the tear strength of the rubber.

The rubber insert such as 15 is normally formed by compression molding or the like and is typically cured by heating to a temperature and for a length of time sufficient to cause the rubber to cross-link or vulcanize. Heating can be done in a forced-air furnace, in a hot salt bath, or by induction heating. Normally, a temperature between 275° and 400°F. for a time of between 2 and 45 minutes is sufficient.

To further exemplify the advantages of the invention, a plurality of molded rubber inserts, such as 15, each having a hardness of 41 Durometer (Shore A), generally oval in shape having a larger diameter of about 3 inches and a smaller diameter of about 2½ inches, and an axial length of 2½ inches were assembled into bushings between oval outer sleeves such as 20 and generally rectangular inner sleeves such as 18. The bushings were bonded utilizing the adhesive system and filled with damping fluid as previously described. Two of the bushings were tested statically and others were tested on a Resonant Beam Dynamic Rate Tester. In the static test, each bushing was securely held while a load was applied thereto radially at the rate of 0.125 in/min. Appropriate strain gauges were used to measure the stress in pounds required to maintain the load rate. Curve A in FIG. 7 shows the results of these tests in the direction through the fluid-filled pockets, while Curve B represents the results obtained in the B direction through the solid side of the bushing. The ratio of the static rate in the B direction to that in the A direction for the two bushings was 4.96, thus indicating that the bushing will deflect 5 times as much in the radial direction through the pockets at a given load as it will in the radial direction at right angles thereto.

Values of the dynamic spring rate in the direction through the pockets will normally decrease as the size of the orifice in the tube increases, while the damping coefficient will first increase and then decrease as the size of the orifice increases.

Figure 6:
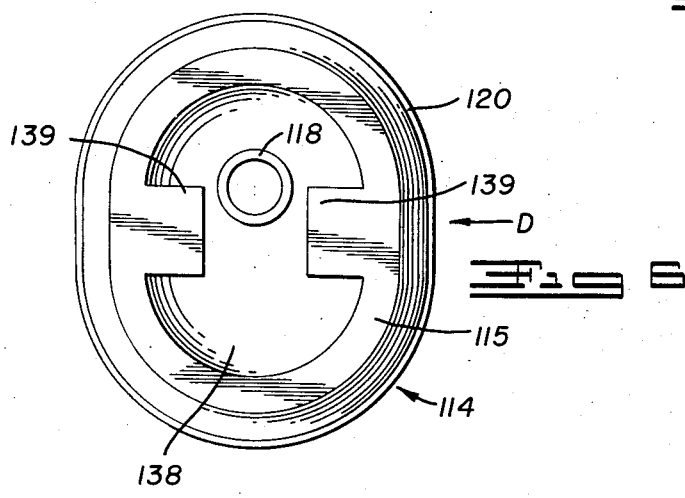
FIG. 6 is an end view of a modified form of the bushing of the present invention.

FIG. 6 shows a modified bushing contemplated within the concept of the present invention, wherein a bushing 114 having an outer sleeve 120 and a circular inner sleeve 118 contains a rubber insert 115 radially compressed therebetween. Each end of the insert contains an appropriate void 138 as previously described but with the addition of a pair of snubbers 139 or arresters. These snubbers or arresters serve to contact the inner sleeve during radial deflection in the D direction at right angles to the fluid-filled pockets. Under normal static load, the inner sleeve 118 will be positioned between the two bumpers. As the outer sleeve 120 is deflected toward the inner sleeve 118, the bumpers will contact the inner sleeve causing a rapid increase in the stiffness of the bushing in that direction, and a resultant increase in the radial spring rate.

Other variations can be made in the teachings of the present invention without departing from the scope thereof as defined by the claims in which I claim:

1. A fluid-damped, resilient bushing comprising a rigid inner sleeve, a rigid outer sleeve disposed around and radially spaced from said inner sleeve and a cured elastomeric insert radially compressed between said inner and outer sleeves said insert including
   A. axially opposed end portions filling the radial space between said inner and outer sleeves, each radial face of said end portions having an axially inwardly extending recess in a portion of said face adjacent said inner sleeve and
   B. a body portion between said ends having a pair of diametrically opposed, axially extending, fluid filled cavities in the outer surface thereof, said cavities innerconnected by a restricted fluid passage, wherein
the axial length of said fluid filled cavities and the axial inward extent of each of said recesses are such that only a pair of thin flexible webs of elastomeric material separate each cavity from said recesses.

2. The bushing as described in claim 1 wherein the longitudinal axis of said inner sleeve is parallel to but radially offset from the longitudinal axis of said bushing toward one of said fluid filled cavities.

3. The bushing as described in claim 1 wherein said inner sleeve is of generally rectangular cross-section and is disposed so as to present an area to the direction along a line through said fluid filled cavities and perpendicular to the longitudinal axis of said bushing which is smaller than the area presented to the direction along a radial line 90° from said first direction.

4. The bushing as described in claim 2 wherein said inner sleeve is of generally rectangular cross-section and is disposed so as to present an area to the direction along a line through said fluid filled cavities and perpendicular to the longitudinal axis of said bushing which is smaller than the area presented to the direction along a radial line 90° from said first direction.

* * * * *